(12) United States Patent
Kim et al.

(10) Patent No.: US 11,552,378 B2
(45) Date of Patent: Jan. 10, 2023

(54) FUSING APPARATUS

(71) Applicant: LG Chem, Ltd., Seoul (KR)

(72) Inventors: Ki-Hyun Kim, Daejeon (KR); Chang-Bog Lee, Daejeon (KR)

(73) Assignee: LG Energy Solution, Ltd.

(\*) Notice: Subject to any disclaimer, the term of this patent is extended or adjusted under 35 U.S.C. 154(b) by 139 days.

(21) Appl. No.: 16/766,786

(22) PCT Filed: Aug. 7, 2019

(86) PCT No.: PCT/KR2019/009912
§ 371 (c)(1),
(2) Date: May 26, 2020

(87) PCT Pub. No.: WO2020/032592
PCT Pub. Date: Feb. 13, 2020

(65) Prior Publication Data
US 2020/0373550 A1    Nov. 26, 2020

(30) Foreign Application Priority Data
Aug. 8, 2018  (KR) .......................... 10-2018-0092537

(51) Int. Cl.
*H01M 50/20* (2021.01)
*H01M 50/581* (2021.01)
(Continued)

(52) U.S. Cl.
CPC ..... *H01M 50/581* (2021.01); *H01M 10/4257* (2013.01); *H01M 10/48* (2013.01);
(Continued)

(58) Field of Classification Search
CPC ............... H01M 10/581; H01M 50/20; H01M 10/4257; H01M 10/48
See application file for complete search history.

(56) References Cited

U.S. PATENT DOCUMENTS

2008/0166627 A1   7/2008 Mori et al.
2010/0328014 A1  12/2010 Suzuki et al.
(Continued)

FOREIGN PATENT DOCUMENTS

CN   101937795 A   1/2011
CN   106030951 A  10/2016
(Continued)

OTHER PUBLICATIONS

Extended European Search Report including Written Opinion for Application No. EP19847318.3 dated Jan. 25, 2021.
(Continued)

*Primary Examiner* — Olatunji A Godo
(74) *Attorney, Agent, or Firm* — Lerner, David, Littenberg, Krumholz & Mentlik, LLP

(57) ABSTRACT

A fusing apparatus including a main connection member provided on a main path and having one side and the other side electrically connected to the main path, respectively, a sub connection member provided on a sub path and having one side and the other side electrically connected to the sub path, respectively, and a shifting member provided between the main connection member and the sub connection member and configured to be moved and coupled from the main connection member to sub connection member to shift a connection relation from a connected state of the main connection member to a connected state of the sub connection member.

17 Claims, 11 Drawing Sheets

(51) Int. Cl.
  *H01M 10/42*  (2006.01)
  *H01M 10/48*  (2006.01)
  *H02J 7/00*   (2006.01)
  *H02J 7/34*   (2006.01)

(52) U.S. Cl.
  CPC .......... *H01M 50/20* (2021.01); *H02J 7/0031* (2013.01); *H02J 7/34* (2013.01); *H01M 2200/103* (2013.01); *H01M 2220/20* (2013.01)

(56) References Cited

U.S. PATENT DOCUMENTS

| | | | |
|---|---|---|---|
| 2014/0127549 | A1 | 5/2014 | Roh et al. |
| 2014/0186667 | A1 | 7/2014 | Lee et al. |
| 2014/0266561 | A1* | 9/2014 | Horne .................... H01H 85/44 337/12 |
| 2015/0248979 | A1 | 9/2015 | Parks et al. |
| 2016/0190865 | A1 | 6/2016 | Shin et al. |
| 2016/0344013 | A1 | 11/2016 | Lee et al. |
| 2018/0277325 | A1 | 9/2018 | De Palma et al. |

FOREIGN PATENT DOCUMENTS

| | | | |
|---|---|---|---|
| CN | 107949895 A | 4/2018 |
| DE | 19712387 A1 | 10/1997 |
| FR | 2953322 A1 | 6/2011 |
| JP | 2700112 B2 | 1/1998 |
| JP | 2007250205 A | 9/2007 |
| JP | 2010040282 A | 2/2010 |
| JP | 2014054070 A | 3/2014 |
| JP | 2017004968 A | 1/2017 |
| JP | 201773906 A | 4/2017 |
| KR | 910001885 B1 | 3/1991 |
| KR | 19980021481 U | 7/1998 |
| KR | 19980035975 U | 9/1998 |
| KR | 20060019772 A | 3/2006 |
| KR | 20090059868 A | 6/2009 |
| KR | 101517388 B1 | 5/2015 |
| KR | 20160094010 A | 8/2016 |
| KR | 20160127003 A | 11/2016 |
| KR | 101691618 B1 | 12/2016 |
| KR | 20160142303 A | 12/2016 |
| WO | 2016194584 A1 | 12/2016 |
| WO | 2018027211 A1 | 2/2018 |

OTHER PUBLICATIONS

International Search Report for Application No. PCT/KR2019/009912 dated Nov. 26, 2019, 3 pages.
Search Report dated Mar. 21, 2022 from the Office Action for Chinese Application No. 201980013317 dated Mar. 28, 2022, 2 pgs.
Examination Report from the Office Action for Indian Application No. 202017030021 dated Oct. 26, 2022, 2 pages.

* cited by examiner

FUSING APPARATUS

CROSS-REFERENCE TO RELATED APPLICATIONS

The present application is a national phase entry under 35 U.S.C. § 371 of International Application No. PCT/KR2019/009912 filed Aug. 7, 2019, published in Korean, which claims priority from Korean Patent Application No. 10-2018-0092537 filed Aug. 8, 2018, all of which are incorporated herein by reference.

TECHNICAL FIELD

The present disclosure relates to a fusing apparatus, and more particularly, to a fusing apparatus capable of effectively fusing a path while fusing a connection relation between a main path and a sub path provided at a battery pack.

BACKGROUND ART

In recent years, the demand for portable electronic products such as notebook computers, video cameras and portable phones has increased sharply, and the electric vehicles, energy storage batteries, robots and satellites has been active developed. Accordingly, high-performance secondary batteries allowing repeated charging and discharging are being actively studied.

Secondary batteries commercially available at present include nickel cadmium batteries, nickel hydrogen batteries, nickel zinc batteries, lithium secondary batteries, and the like. Among them, lithium secondary batteries have almost no memory effect compared to nickel-based secondary batteries, and thus are free of charge and discharge. Also, the lithium secondary batteries are being spotlighted for its very low discharge rate and high energy density.

Meanwhile, recently, the biggest social issue with respect to the battery is the safety of the battery. In the case of laptops and mobile phones, the population of users is rapidly increasing, and it is urgent to secure battery safety since the explosion of the battery damages portable electronic products and also may lead to fire. Thus, in the related art, various protection devices are used to secure the safety of the battery by blocking a charge and discharge current when detecting an abnormal state of the battery.

The conventional battery pack protection device is connected to a cell assembly including at least one battery cell, and generally includes a fuse for blocking a current flow by irreversibly disconnecting a line through which a charge and discharge current flows, in order to protect the battery pack when an abnormal situation such as overcharge, overdischarge, short circuit or overcurrent occurs.

The fuse is a kind of automatic circuit breaker used to prevent overcurrent from continuously flowing through a wire. For example, the fuse is operated to disconnect a wire by melting itself due to the heat generated by the overcurrent flowing through the wire.

Generally, the fuse is configured to perform only one operation of disconnecting the wire in an emergency. However, there is a demand for disconnecting a main path and simultaneously connecting a sub path so that power or signal is transmitted even in an emergency.

SUMMARY

Technical Problem

The present disclosure is designed to solve the problems of the related art, and therefore the present disclosure is directed to providing a fusing apparatus, which may effectively fuse a path while fusing a connection relation between a main path and a sub path provided at a battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a fusing apparatus, comprising: a main connection member positioned on a main path and including a first side and a second other side electrically connected to the main path, respectively; a sub connection member positioned on a sub path and including a first side and a second side electrically connected to the sub path, respectively; and a shifting member positioned between the main connection member and the sub connection member, and configured to move from being coupled to the main connection member to being coupled to the sub connection member to shift from a connected state of the main connection member to a connected state of the sub connection member.

The main path may be coupled to a positive electrode terminal and a negative electrode terminal of a cell assembly and the fusing apparatus may be configured to provide an electrical connection along the main path when the main connection member is in the connected state.

The sub path may include a discharge resistor, may be electrically connected to the positive electrode terminal and the negative electrode terminal of the cell assembly, and the fusing apparatus may be configured to provide an electrical connection along the sub path when sub connection member is in the connected state.

Also, the shifting member may be configured to disconnect the main path by opening the connection relation of the main connection member and to connect the sub path by closing the connection relation of the sub connection member.

Also, the main connection member may include a first main connection member portion and a second main connection member portion, each including an electrically conductive material, positioned on a same line of the main path, and spaced apart from each other by a first predetermined distance.

Also, the main connection member may be configured such that a first side of the first main connection member portion is electrically connected to a first end of the main path, a first side of the second main connection member portion is electrically connected to a second end of the main path, and each of a second side of the first main connection member portion and a second side of the second main connection member portion are electrically connected to the shifting member.

Also, the sub connection member may include a first sub connection member portion and a second sub connection member portion, each including an electrically conductive material and spaced apart from each other by a second predetermined distance.

Also, the shifting member may be positioned between the first sub connection member portion and the second sub connection member portion to electrically connect the first sub connection member portion to the second sub connection member portion.

Also, the first sub connection member portion and the second sub connection member portion may be parallel to each other, and wherein at least part of the first sub connection member portion and at least part of the second sub connection member portion may face toward each other.

Also, the shifting member may include: a body portion positioned between the first main connection member portion and the second main connection member portion to connect the first main connection member portion to the second main connection member portion; and an insert portion mounted to the body portion and positioned between the first sub connection member portion and the second sub connection member portion to connect the first sub connection member portion to the second sub connection member portion.

Also, each of the first sub connection member portion and the second sub connection member portion, may respectively include at least one hole, wherein the holes are aligned in a direction perpendicular to the sub path so that the insert portion is capable of being inserted therethrough.

Also, the fusing apparatus may further comprise an operation member configured to move in a direction perpendicular to the main path and the sub path to contact a first surface of the body portion so that the body portion is detached from the main connection member.

The fusing apparatus may further comprise a guide member configured to contact the operation member, the shifting member and the sub connection member in the perpendicular direction to maintain alignment of the operation member, the shifting member and the sub connection member.

The shifting member may further include an insulating portion made of an insulating material and mounted to the insert portion in a direction perpendicular to the main path and the sub path to connect the first sub connection member portion to the second sub connection member portion.

The shifting member may include a plurality of insert portions mounted to the body portion.

Each of the first sub connection member and the second sub connection member may include a plurality of holes through which the plurality of insert portions are inserted, respectively.

A battery pack may comprise a fusing apparatus according to any of the embodiments of the present disclosure.

Advantageous Effects

According to an aspect of the present disclosure, it is possible to disconnect the main path and simultaneously connect the sub path by using the shifting member.

In addition, according to an aspect of the present disclosure, the shifting member may be effectively moved using the operation member.

In particular, according to an embodiment of the present disclosure, it is possible to provide a fusing apparatus, which may effectively shift the connection relation as the shifting member is moved and coupled from the main path to the sub path.

The present disclosure may have various effects other than the above, and other effects of the present disclosure may be understood from the following description and more clearly figured out by the embodiments of the present disclosure.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
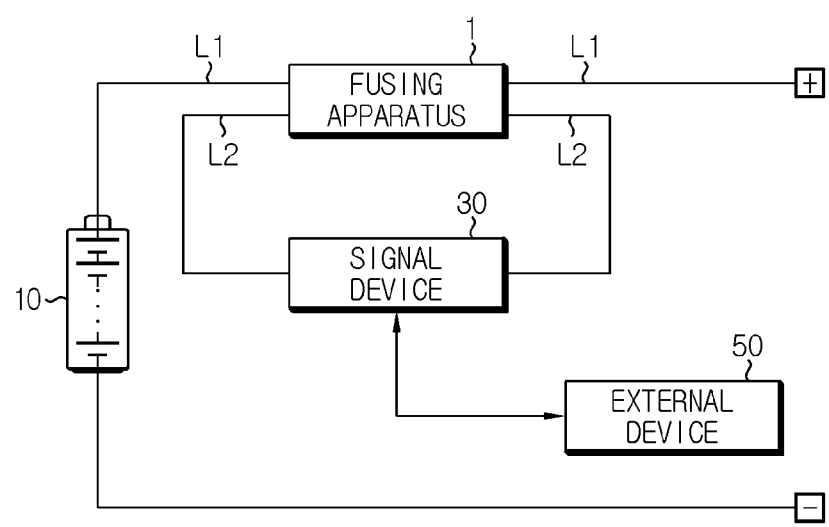
FIG. 1 is a diagram schematically showing a fusing apparatus according to an embodiment of the present disclosure connected to some components of a battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Further, in describing the present disclosure, if it is determined that a detailed description of a related known structure or function may obscure the subject matter of the present disclosure, the detailed description will be omitted.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

A fusing apparatus 1 according to an embodiment of the present disclosure may be a fuse provided in a battery pack. For example, the fusing apparatus 1 according to an embodiment of the present disclosure may be provided on a charging and discharging path configured to supply a charge and discharge power to at least one secondary battery to block the charging and discharging path. More specifically, the fusing apparatus 1 according to an embodiment of the present disclosure may be electrically connected to a main path L1 and a sub path L2. Here, the main path L1 may be a path connected between a cell assembly 10 having the at least one secondary battery included in the battery pack and a vehicle load to supply a power from the cell assembly 10 to the vehicle load. Also, the sub path L2 may be a path for supplying a power to a signal device 30 or transmitting a signal to the signal device 30 so as to transmit an emergency signal from the signal device 30 to an external device 50 when the main path L1 is blocked due to an emergency situation. For example, if the fusing apparatus 1 according to an embodiment of the present disclosure is provided to the battery pack of the vehicle, the external device 50 may be a display device for notifying a driver of an emergency situation. Alternatively, the external device 50 may be an electronic control unit (ECU) of the vehicle.

Figure 2:
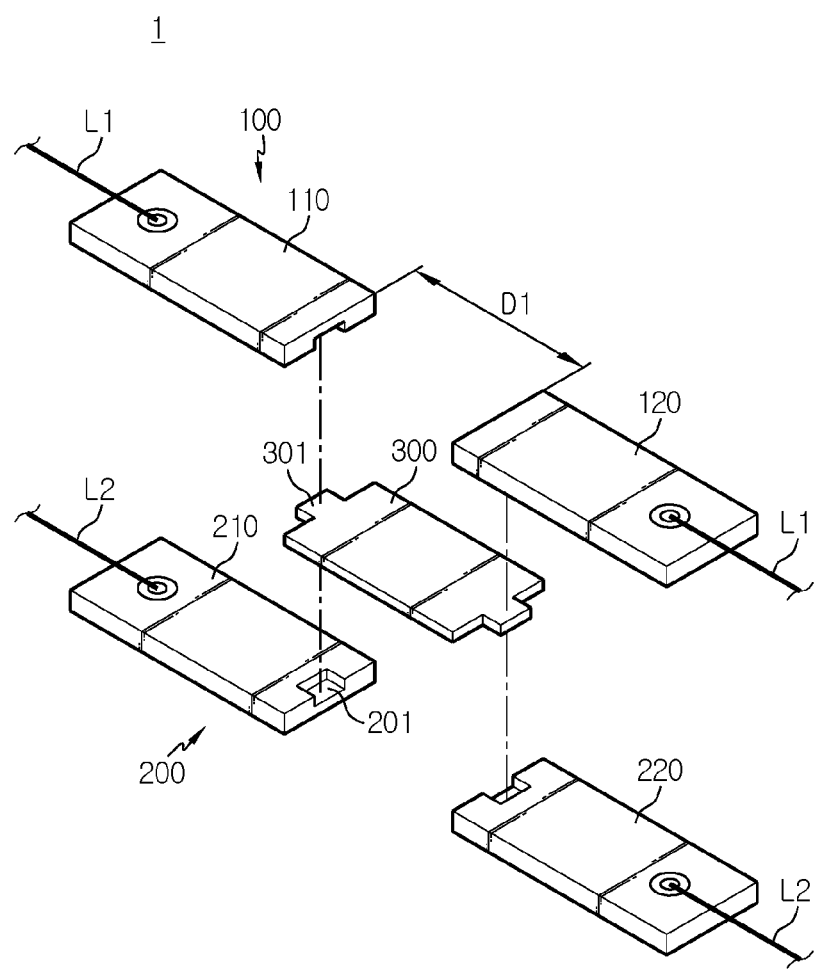
FIG. 2 is a perspective view showing the fusing apparatus according to an embodiment of the present disclosure.

FIG. 1 is a diagram schematically showing that a fusing apparatus according to an embodiment of the present disclosure is connected to some components of a battery pack, and FIG. 2 is a perspective view showing the fusing apparatus according to an embodiment of the present disclosure.

Referring to FIGS. 1 and 2, a fusing apparatus 1 according to an embodiment of the present disclosure includes a main connection member 100, a sub connection member 200, and a shifting member 300.

The main connection member 100 may be provided on the main path L1. More specifically, the main connection member 100 may be configured to be electrically connected to the main path L1 so that the main path L1 may become an electrically closed circuit. For example, as shown in FIGS. 1 and 2, the main connection member 100 may be provided on the main path L1 and electrically connected to the main path L1.

In addition, the main connection member 100 may have one side and the other side electrically connected to the main path L1, respectively. For example, as shown in FIG. 2, one side and the other side of the main connection member 100 may be electrically connected to one end and the other end of the main path L1, respectively.

The sub connection member 200 may be provided on the sub path L2. More specifically, the sub connection member 200 may be configured to be electrically connected to the sub path L2 such that the sub path L2 may be an electrically closed circuit. For example, as shown in FIGS. 1 and 2, the sub connection member 200 may be provided on the sub path L2 and be electrically connected to the sub path L2.

In addition, the sub connection member 200 may have one side and the other side electrically connected to the sub path L2, respectively. For example, as shown in FIG. 2, one side and the other side of the sub connection member 200 may be electrically connected to one end and the other end of the sub path L2, respectively.

The shifting member 300 may be provided between the main connection member 100 and the sub connection member 200. For example, as shown in FIG. 2, the shifting member 300 may be provided between the main connection member 100 and the sub connection member 200 and connected to the main connection member 100 and the sub connection member 200, respectively.

In addition, the shifting member 300 may be configured to be moved and coupled from the main connection member 100 to the sub connection member 200. For example, in the second embodiment of FIG. 2, the shifting member 300 may be connected to the main connection member 100 when the connected state of the main path L1 is a closed circuit. Subsequently, the shifting member 300 may move from the main connection member 100 toward the sub connection member 200 and be connected to the sub connection member 200. In this case, the shifting member 300 may be electrically coupled to the sub connection member 200.

In addition, the shifting member 300 may be configured to shift the connection relation from the connected state of the main connection member 100 to the connected state of the sub connection member 200. For example, the shifting member 300 may shift the connection relation from the connected state of the main connection member 100, where the main connection member 100 is electrically connected to the shifting member 300 to form a closed circuit so that the main path L1 is electrically connected, to the connected state of the sub connection member 200, where the sub connection member 200 is electrically connected to the shifting member 300 to form a closed circuit so that the sub path L2 is electrically conducted.

Preferably, as shown in FIG. 2, the main connection member 100 according to an embodiment of the present disclosure may be configured to extend in one direction (a D1 direction) on the main path L1. In addition, the sub connection member 200 may be configured to extend in one direction (the D1 direction) on the sub path L2.

Preferably, the shifting member 300 according to an embodiment of the present disclosure may be configured to disconnect the main path L1 by opening the connection relation of the main connection member 100 and to connect the sub path L2 by closing the connection relation of the sub connection member 200. For example, as the shifting member 300 moves from main connection member 100 to the sub connection member 200 and is coupled to the sub connection member 200, the main path L1 may become an open circuit and the sub path L2 may become a closed circuit.

More preferably, as shown in FIG. 2, the shifting member 300 according to an embodiment of the present disclosure may include a protruding portion 301. In addition, as shown in FIG. 2, the main connection member 100 and the sub connection member 200 according to an embodiment of the present disclosure may have a concave portion 201, respectively.

The protruding portion 301 may be provided at both ends of the shifting member 300, respectively. In addition, as shown in FIG. 2, the protruding portion 301 may be configured to protrude outward from the shifting member 300.

The concave portion 201 may be provided at one side and the other side of the main connection member 100 and the sub connection member 200, respectively. In addition, as shown in FIG. 2, the concave portion 201 may be configured to form a hollow at an inner side of the main connection member 100 and the sub connection member 200, respectively.

Preferably, the main connection member 100 according to an embodiment of the present disclosure may include a first main connection member 110 and a second main connection member 120.

The first main connection member 110 and the second main connection member 120 may include an electrically conductive material and be provided on the same line of the main path L1 to be spaced apart from each other by a predetermined distance. For example, as shown in FIG. 2, the first main connection member 110 and the second main connection member 120 may be provided to be spaced apart from each other by a predetermined separated distance D1 on an extension line of the main path L1. In this case, the separated distance D1 may be equal to the length of the shifting member 300.

More preferably, as shown in FIG. 2, the main connection member 100 according to an embodiment of the present disclosure may be configured such that one side of the first main connection member 110 is electrically connected to one end of the main path L1 the other side of the second main connection member 120 is electrically connected to the other end of the main path L1.

In addition, the main connection member 100 may be configured such that the other side of the first main connection member 110 and one side of the second main connection member 120 are electrically connected to the shifting member 300. For example, as shown in FIG. 2, the protruding portions 301 of the shifting member 300 may be coupled to the concave portion 201 formed at the other side of the first main connection member 110 and the concave portion 201 formed at one side of the second main connection member 120, respectively.

Preferably, the sub connection member 200 according to an embodiment of the present disclosure may include a first sub connection member 210 and a second sub connection member 220.

The first sub connection member 210 and the second sub connection member 220 may include an electrically conductive material and be provided to be spaced apart from each other by a predetermined distance. For example, as shown in FIG. 2, the first sub connection member 210 and the second sub connection member 220 may be provided to be spaced apart from each other by a predetermined separated distance D1 on an extension line of the sub path L2. In this case, as shown in FIG. 2, the separated distance D1 may be equal to the length of the shifting member 300 in one direction (the D1 direction).

More preferably, the sub connection member 200 according to an embodiment of the present disclosure may be configured such that the shifting member 300 is coupled to the separated space between the first sub connection member 210 and the second sub connection member 220 to electrically connect the first sub connection member 210 and the second sub connection member 220. For example, as shown in FIG. 2, the sub connection member 200 may be electrically connected as the shifting member 300 is coupled between the first sub connection member 210 and the second sub connection member 220. In this case, the protruding portion 301 provided at the shifting member 300 and the concave portion 201 provided at the sub connection member 200 may be coupled.

Figure 3:
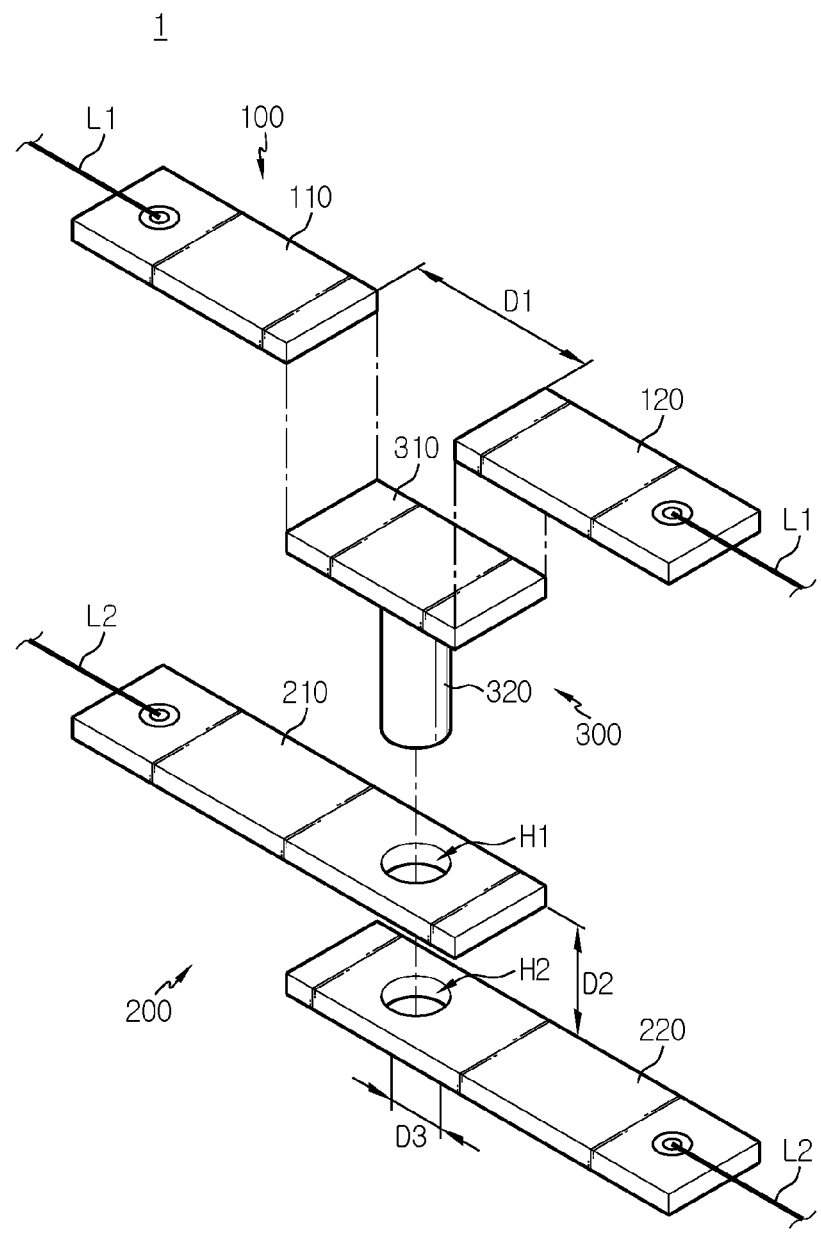
FIG. 3 is a perspective view showing a fusing apparatus according to another embodiment of the present disclosure.
Figure 4:
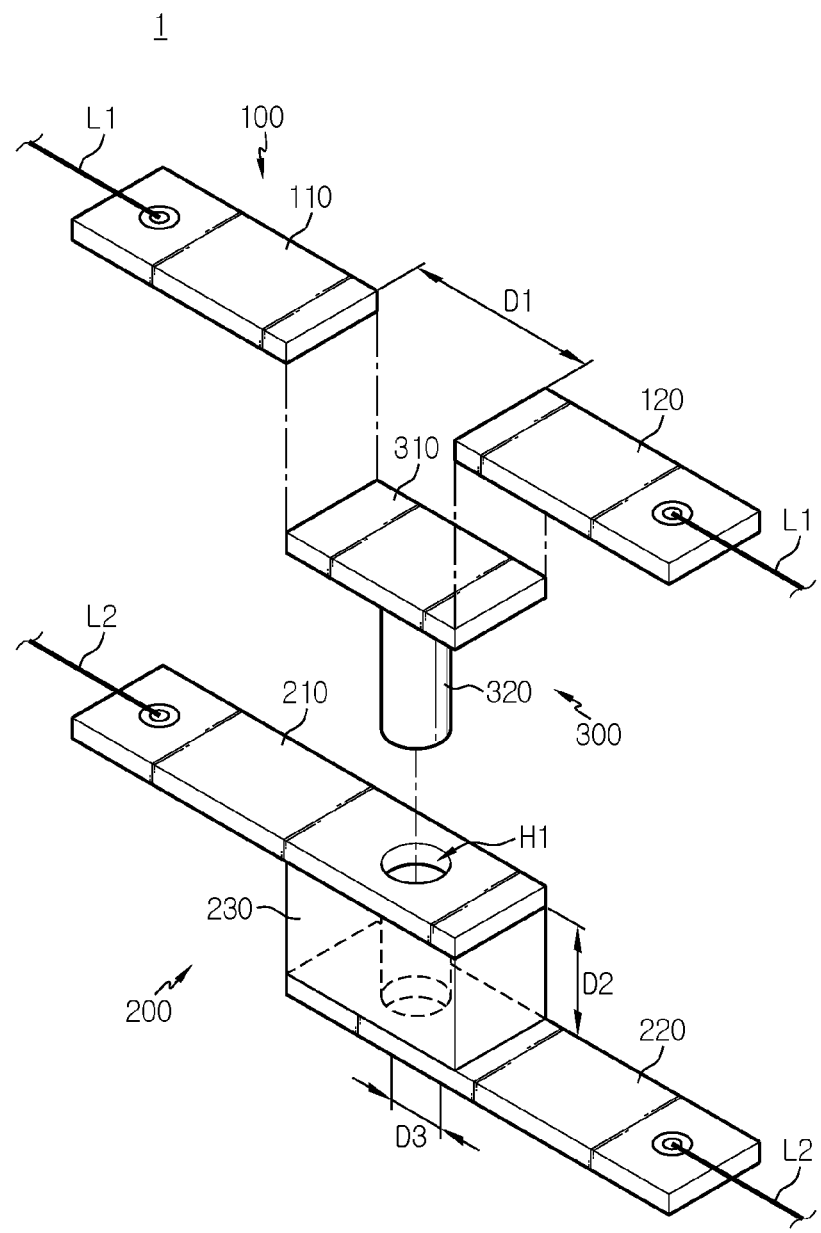
FIG. 4 is a perspective view showing a fusing apparatus according to still another embodiment of the present disclosure.

FIG. 3 is a perspective view showing a fusing apparatus according to another embodiment of the present disclosure, and FIG. 4 is a perspective view showing a fusing apparatus according to still another embodiment of the present disclosure. In addition, in this embodiment, a feature to which the description of the former embodiment may be similarly applied will not be described, and description will be given focusing on different features.

First, referring to FIG. 3, the sub connection member 200 of the fusing apparatus 1 according to an embodiment of the present disclosure may include a first sub connection member 210 and a second sub connection member 220.

Preferably, the first sub connection member 210 and the second sub connection member 220 according to an embodiment of the present disclosure may be provided in parallel to each other. For example, as shown in FIG. 3, the first sub connection member 210 and the second sub connection member 220 may be configured in the form of plates parallel to each other.

In addition, the first sub connection member 210 and the second sub connection member 220 may be configured such that partial areas of the first sub connection member 210 and the second sub connection member 220 face each other. For example, as shown in FIG. 3, the first sub connection member 210 and the second sub connection member 220 may be configured such that partial areas of the first sub connection member 210 and the second sub connection member 220 face each other in a direction perpendicular to the sub path L2.

In particular, the first sub connection member 210 and the second sub connection member 220 may be configured to face each other by an area corresponding to the area of the shifting member 300.

Through this configuration, in the fusing apparatus 1 according to an embodiment of the present disclosure, the shifting member 300 may be easily coupled between the first sub connection member 210 and the second sub connection member 220.

More preferably, the shifting member 300 according to an embodiment of the present disclosure may include a body portion 310 and an insert portion 320.

The body portion 310 may be coupled to the space between the first main connection member 110 and the second main connection member 120 to connect the first main connection member 110 and the second main connection member 120. For example, as shown in FIG. 3, the body portion 310 may have a parallel form having a length corresponding to the separated distance D1 between the first main connection member 110 and the second main connection member 120 and be coupled to the space between the first main connection member 110 and second main connection member 120. In addition, the body portion 310 may include an electrically conductive material to electrically connect the first main connection member 110 and the second main connection member 120 to each other.

The insert portion 320 may be mounted to the body portion 310 and coupled to the space between the first sub connection member 210 and the second sub connection member 220 to connect the first sub connection member 210 and the second sub connection member 220 to each other. For example, as shown in FIG. 3, the insert portion 320 may have a cylindrical shape perpendicularly coupled to the body portion 310. In addition, the insert portion 320 may include an electrically conductive material to electrically connect the first sub connection member 210 and the second sub connection member 220 to each other.

Preferably, as shown in FIG. 3, the first sub connection member 210 and the second sub connection member 220 according to an embodiment of the present disclosure may be provided to be spaced apart from each other by a predetermined distance D2 in a direction perpendicular to the sub path L2.

Also preferably, the insert portion 320 may be configured to extend longer in one direction (the D2 direction) than the distance D2 between the first sub connection member 210 and the second sub connection member 220.

More preferably, the first sub connection member 210 and the second sub connection member 220 according to an embodiment of the present disclosure may have holes H1, H2, respectively.

The holes H1, H2 may be provided on the same line in a direction perpendicular to the sub path L2 so that the insert portion 320 is inserted therethrough. For example, as shown in FIG. 3, the holes H1, H2 may have a circle shape with a diameter corresponding to the length D3 of one surface of the insert portion 320 so that the insert portion 320 is inserted and coupled therein.

Referring to FIG. 4, the fusing apparatus 1 according to an embodiment of the present disclosure may include an insulation member 230.

The insulation member 230 may be provided between the first sub connection member 210 and the second sub connection member 220. More specifically, the insulation member 230 may be provided between the first sub connection member 210 and the second sub connection member 220 and coupled between the first sub connection member 210 and the second sub connection member 220.

In addition, the insulation member 230 according to an embodiment of the present disclosure may be formed to have a height equal to the separated distance D2 between the first sub connection member 210 and the second sub connection member 220. Preferably, as shown in FIG. 4, the insulation member 230 may have a cube shape with a height equal to the separated distance D2 between the first sub connection member 210 and the second sub connection member 220. In addition, the insulation member 230 may have a hollow shaped similar to the insert portion 320 so that the insert portion 320 is inserted therein.

Through this configuration, in the fusing apparatus 1 according to an embodiment of the present disclosure, the insulation member 230 may allow the first sub connection member 210 and the second sub connection member 220 to be firmly positioned so that the shifting member 300 is easily coupled to the sub connection member 200.

In addition, the insulation member 230 may support the first sub connection member 210 and the second sub connection member 220 to prevent the first sub connection member 210 and the second sub connection member 220 from contacting each other due to an external impact. For example, the insulation member 230 may prevent that the first sub connection member 210 and/or the second sub connection member 220 are bent and connected to each other due to an external impact.

Figure 5:
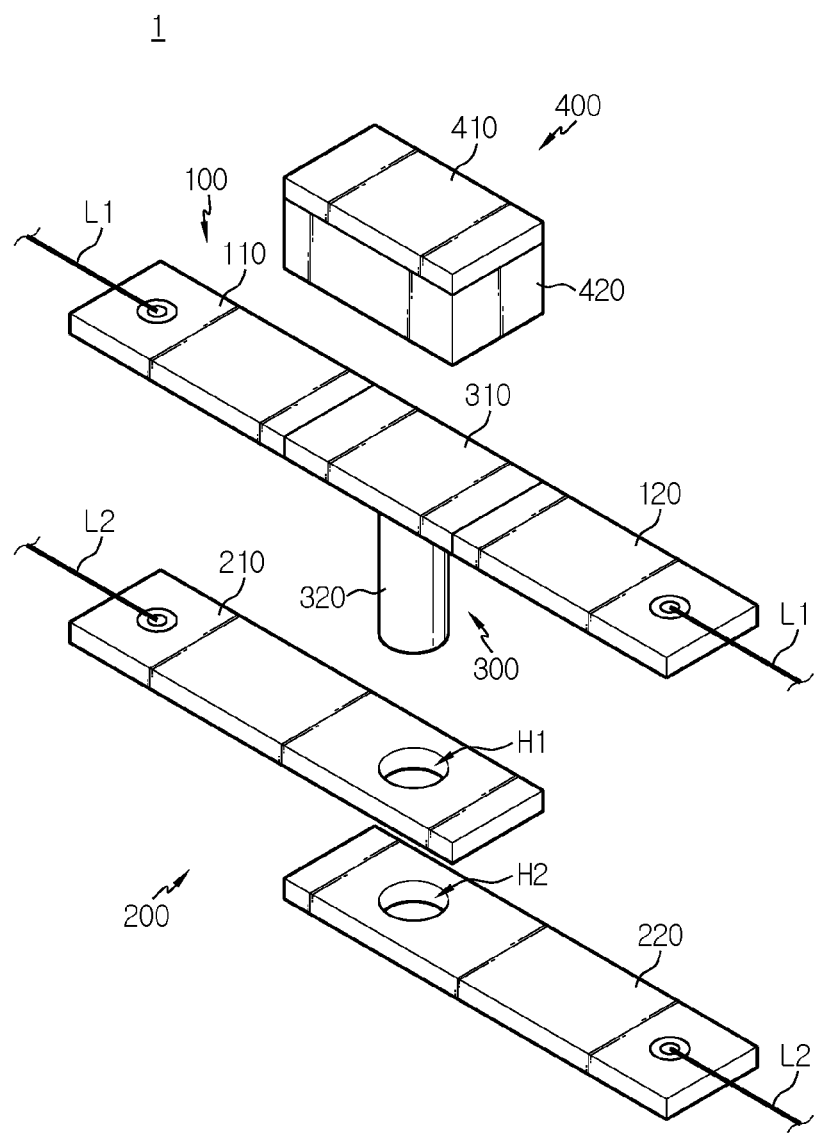
FIGS. 5 and 6 are perspective views for illustrating an operation state of the fusing apparatus according to still another embodiment of the present disclosure.
Figure 6:
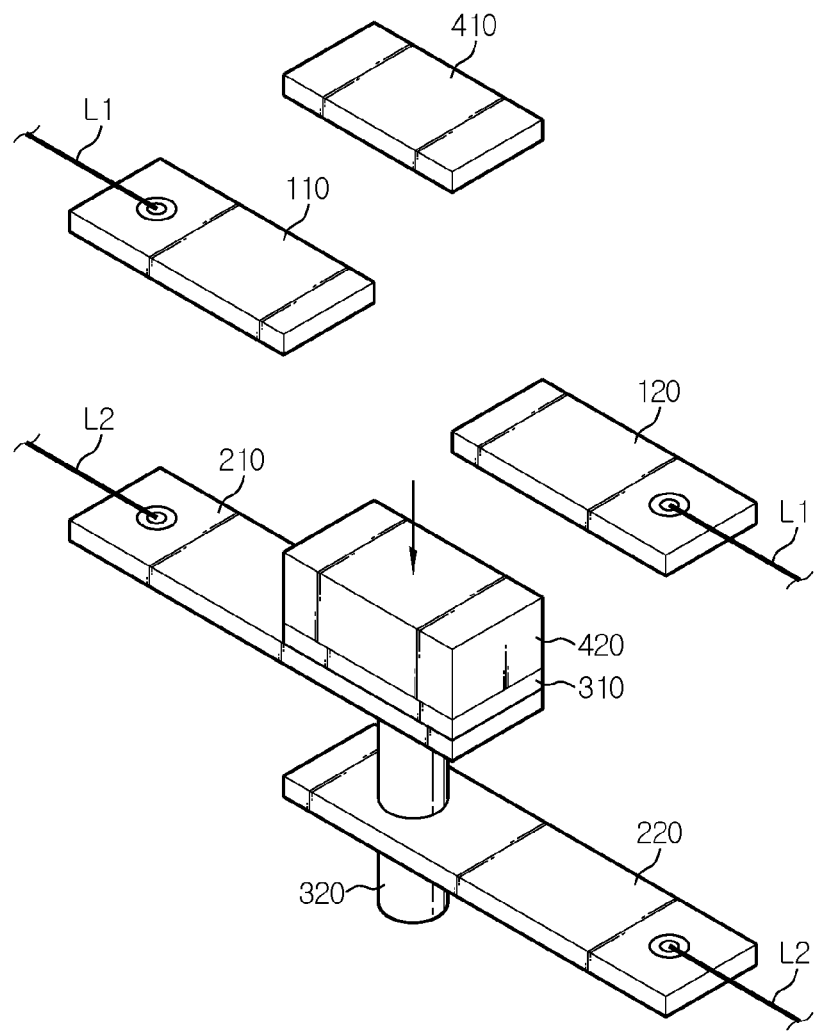

FIGS. 5 and 6 are perspective views for illustrating an operation state of the fusing apparatus according to still another embodiment of the present disclosure. Also, regarding this embodiment, features that may be applied similar to the former embodiment will not be described in detail, and features different from the former embodiment will be described in detail.

First, referring to FIG. 5, the fusing apparatus 1 according to an embodiment of the present disclosure may include an operation member 400.

The operation member 400 may be configured to move in a direction perpendicular to the main path L1 and the sub path L2 to contact one surface of the body portion 310 so that the body portion 310 is detached from the main connection member 100.

For example, as shown in FIG. 5, the operation member 400 may include a first operation member 410 and a second operation member 420.

At ordinary time, the first operation member 410 and the second operation member 420 may be provided at locations spaced apart from the shifting member 300 in a state of being coupled to each other. In addition, in an emergency, the first operation member 410 and the second operation member 420 may be separated from each other so that the second operation member 420 moves toward the shifting member 300.

For example, the operation member 400 may be electrically connected to a microcontroller included in the battery pack to receive an emergency signal from the microcontroller. In addition, when the operation member 400 receives the emergency signal, the first operation member 410 and the second operation member 420 may be separated from each other.

For example, in a situation where the main path L1 needs to be disconnected, the microcontroller may transmit the emergency signal to the operation member 400. After that, if the operation member 400 receives the emergency signal, the explosive provided in the first operation member 410 may explode to separate the first operation member 410 and the second operation member 420.

Referring to FIGS. 5 and 6, the operation member 400 according to an embodiment of the present disclosure may be configured to move in a direction perpendicular to the main path L1 and the sub path L2 to contact one surface of the body portion 310 so that the body portion 310 is detached from the main connection member 100.

First, in the configuration of FIG. 5, the operation member 400 may be provided at one side of the shifting member 300. In this case, the shifting member 300 may be coupled between the first main connection member 110 and the second main connection member 120.

Subsequently, in the configuration of FIG. 6, the first operation member 410 and the second operation member 420 may be separated from each other. In addition, the second operation member 420 may move and contact one surface of the shifting member 300 so that the shifting member 300 is detached from the main connection member 100 and the shifting member 300 is coupled to the sub connection member 200.

Through this configuration, the fusing apparatus 1 according to an embodiment of the present disclosure may disconnect the main path L1 and simultaneously connect the sub path L2.

Figure 7:
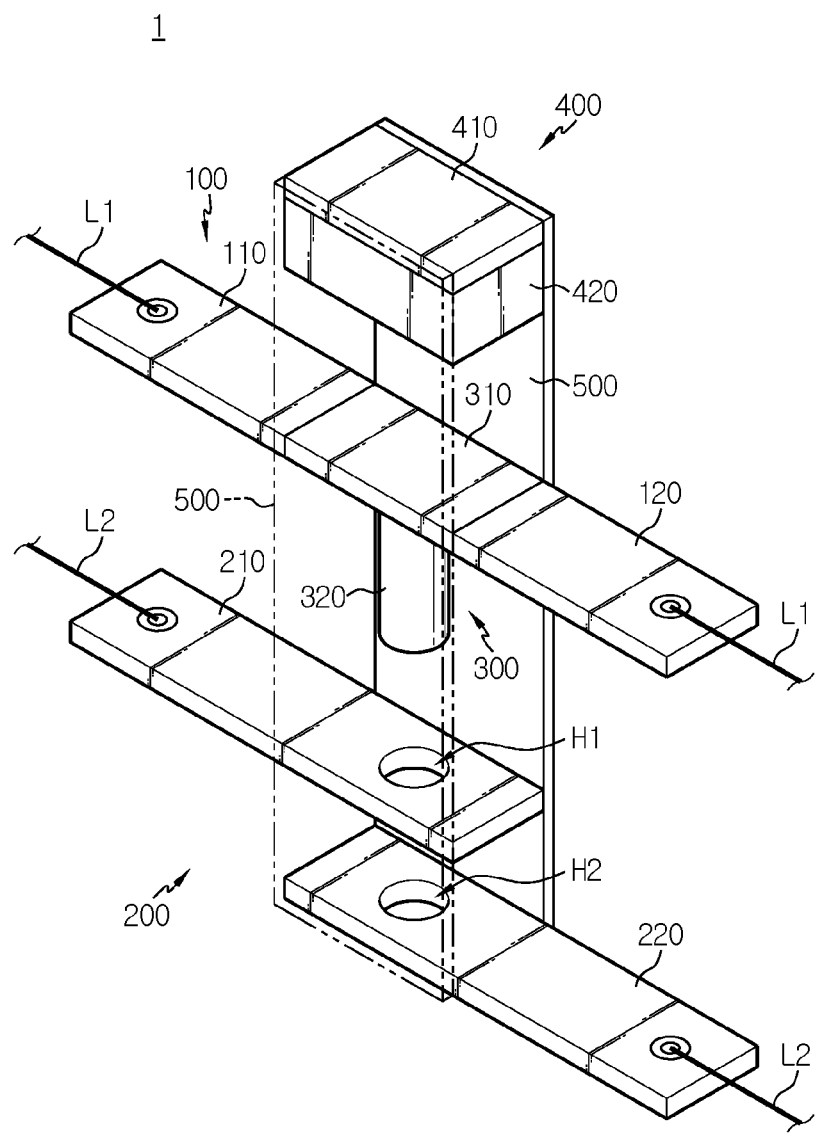
FIG. 7 is a perspective view showing a fusing apparatus according to still another embodiment of the present disclosure.

FIG. 7 is a perspective view showing a fusing apparatus according to still another embodiment of the present disclosure.

Referring to FIG. 7, the fusing apparatus 1 may further include a guide member 500.

The guide member 500 may come into contact with the operation member 400, the shifting member 300 and the sub connection member 200. Preferably, the guide member 500 may be made of an insulating material through which no current flows and may be formed in a plate shape. In addition, the guide member 500 may be in contact with the operation member 400, the shifting member 300 and the sub connection member 200 in a direction perpendicular to the main path L1 and the sub path L2 to align the operation member 400, the shifting member 300 and the sub connection member 200. Meanwhile, although the guide member 500 is depicted transparently in FIG. 7, this is just to illustrate a coupling relationship with the operation member 400, the shifting member 300 and the sub connection member 200, and the physical properties such as transparency of the guide member 500 are not particularly limited by the drawings.

The guide member 500 may align the second operation member 420 and the shifting member 300 not to be misaligned. In addition, the insert portion 320 and the holes H1, H2 may be aligned without misalignment. That is, since the fusing apparatus 1 further includes the guide member 500, when the explosive provided in the first operation member 410 explodes to separate the first operation member 410 and the second operation member 420, the insert portion 320 may be more easily inserted into the holes H1, H2.

In this case, even if the operation member 400, the shifting member 300 and the holes H1, H2 of the fusing apparatus 1 are not aligned in the vertical direction but are inclined, the second operation member 420 may be accurately moved toward the shifting member 300 along the guide member 500. Further, the insert portion 320 may be correctly inserted into the holes H1, H2. That is, the fusing apparatus 1 including the guide member 500 may be mounted to the battery pack in a vertical direction, an inclined direction, or a direction perpendicular to the vertical direction, and may also disconnect the main path L1 and connect the sub path L2 regardless of the mounted direction.

In addition, the guide member 500 is formed to have a rigidity that does not bend even under a normal shock. Thus, even if an external shock is applied to the fusing apparatus 1, it is possible to prevent the first sub connection member 210 and the second sub connection member 220 are bent to contact each other.

Thus, the fusing apparatus 1 may more precisely disconnect the main path L1 and connect the sub path L2. In addition, the fusing apparatus 1 may prevent the sub connection member 200 from being electrically connected unexpectedly due to an external shock.

Figure 8:
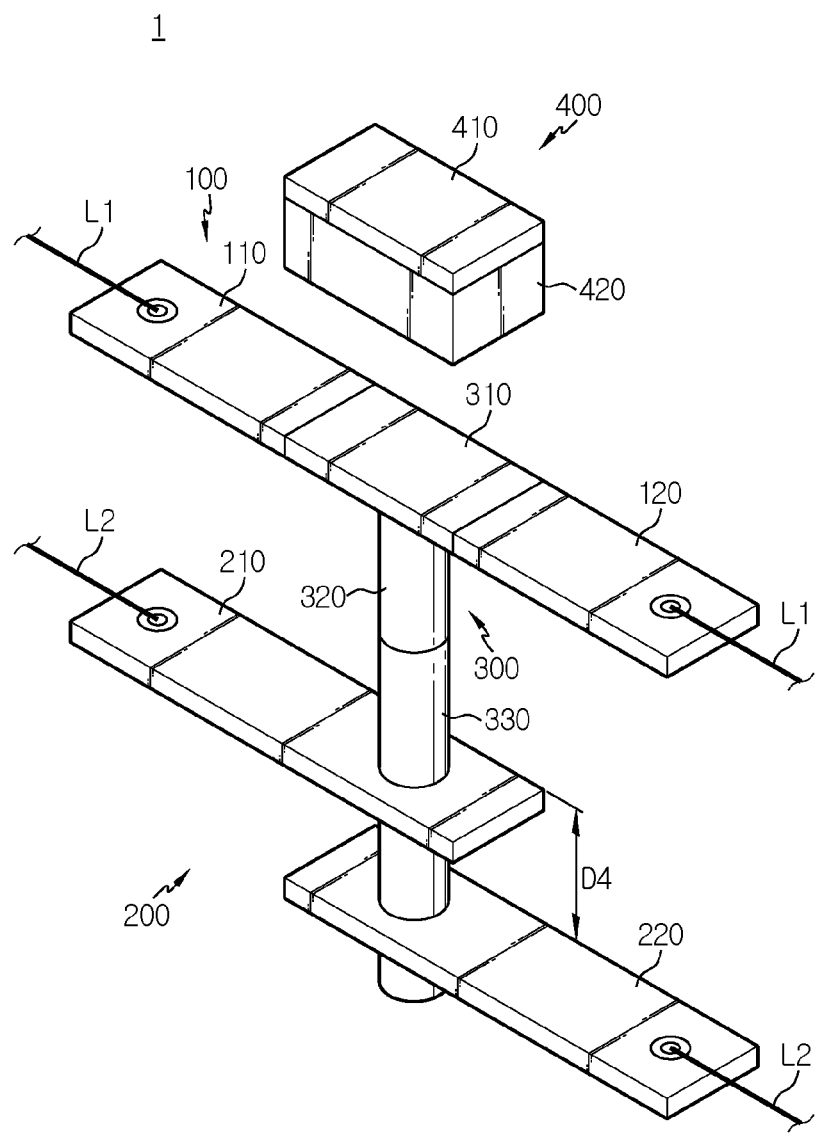
FIGS. 8 and 9 are perspective views for illustrating an operation state of the fusing apparatus according to still another embodiment of the present disclosure.
Figure 9:
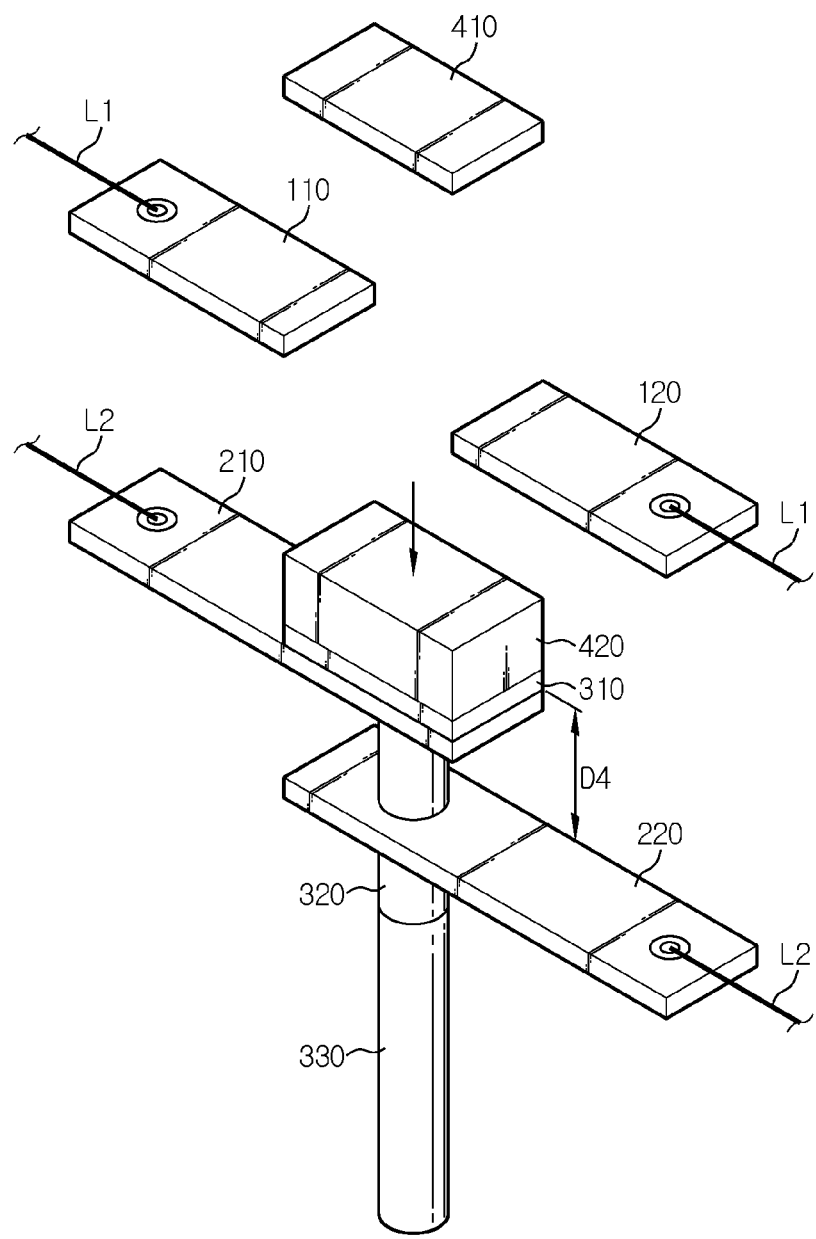

FIGS. 8 and 9 are perspective views for illustrating an operation state of the fusing apparatus according to still another embodiment of the present disclosure.

Referring to FIGS. 8 and 9, the shifting member 300 of the fusing apparatus 1 may further include an insulating portion 330 mounted at one end of the insert portion 320. Preferably, the insulating portion 330 may be made of an insulating material and mounted to the insert portion 320 in a direction perpendicular to the main path L1 and the sub path L2. In addition, the insulating portion 330 may be configured to connect the first sub connection member 210 and the second sub connection member 220 to each other. Also, the insulating portion 330 may have a cylindrical shape similar to the insert portion 320 so as to be inserted into the hole H1 of the first sub connection member 210 and the hole H2 of the second sub connection member 220.

As shown in FIG. 8, when the first operation member 410 and the second operation member 420 are not separated, the insulating portion 330 may be inserted into the hole H1 of the first sub connection member 210 and the hole H2 of the second sub connection member 220. Preferably, the length of the insulating portion 330 may be longer than the distance D4 between the same planes of the first sub connection member 210 and the second sub connection member 220.

Here, the distance D4 between the same planes of the first sub connection member 210 and the second sub connection member 220 may be longer than the distance D2 between the first sub connection member 210 and the second sub connection member 220 shown in FIG. 4. For example, as shown in FIG. 8, the distance D4 may be a distance between the top surfaces of the first sub connection member 210 and the second sub connection member 220.

After that, when the explosive provided in the first operation member 410 explodes to separate the first operation member 410 and the second operation member 420, as shown in FIG. 9, the insert portion 320 may be inserted into the hole H1 of the first sub connection member 210 and the hole H2 of the second sub connection member 220. That is, when the first operation member 410 and the second operation member 420 are separated from each other, the insulating portion 330 may be inserted into the holes H1, H2 in advance so that the insert portion 320 are inserted into the holes H1, H2 without misalignment.

In addition, when the insert portion 320 is inserted into the holes H1, H2, the insulating portion 330 is mounted to the insert portion 320 but may not contact the holes H1, H2. Thus, the insert portion 320 may be exactly inserted into the holes H1, H2, and the sub path L2 may be electrically connected through the insert portion 320 having an electrically conductive material.

Since the shifting member 300 having the insulating portion 330 is included in the fusing apparatus 1, the connection stability between the insert portion 320 and the sub connection member 200 may be further improved.

Figure 10:
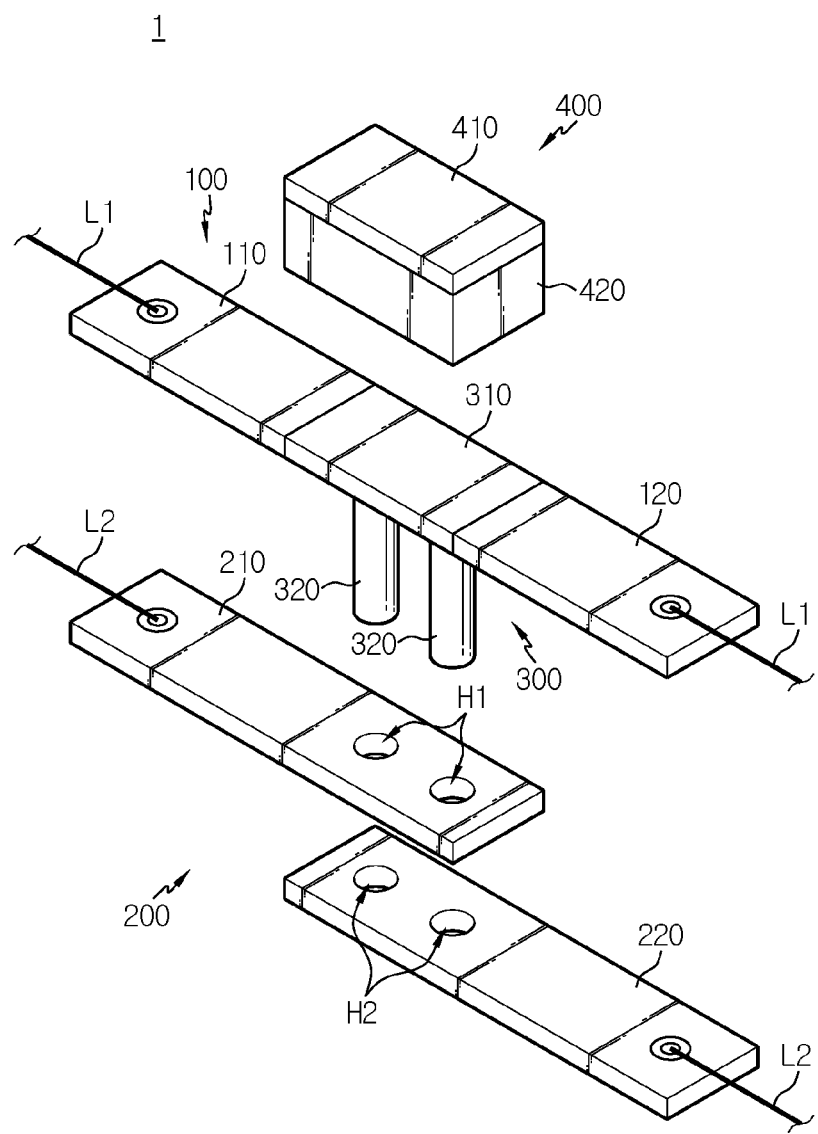
FIG. 10 is a perspective view showing a fusing apparatus according to still another embodiment of the present disclosure.

FIG. 10 is a perspective view showing a fusing apparatus according to still another embodiment of the present disclosure.

Referring to FIG. 10, the shifting member 300 may include a plurality of insert portions 320. In addition, the first sub connection member 210 and the second sub connection member 220 may have a plurality of holes H1, H2 to correspond to the plurality of insert portions 320, respectively.

That is, the shifting member 300 may include a plurality of insert portions 320 mounted to the body portion 310. In addition, the first sub connection member 210 and the second sub connection member 220 may be configured to include a plurality of holes H1, H2, respectively, so that the plurality of insert portions 320 are inserted therethrough.

Since the fusing apparatus 1 includes the plurality of insert portions 320 and the plurality of holes H1, H2, the coupling stability between the shifting member 300 and the sub connection member 200 may be improved. That is, the connection between the plurality of insert portions 320 and the plurality of holes H1, H2 is further strengthened, thereby preventing the sub path L2 from being disconnected due to poor contact or the like.

In addition, when the plurality of insert portions 320 are inserted into the corresponding plurality of holes H1, H2, the external shock applied to the fusing apparatus 1 may be distributed to the insert portions 320. Thus, the fusing apparatus 1 having the plurality of insert portions 320 may be more resistant to an external impact.

Although not shown in the drawings, the fusing apparatus 1 shown in FIG. 10 may further include a guide member 500 and/or an insulating portion 330. In this case, the coupling stability of the plurality of holes H1, H2 corresponding to the insert portions 320 may be further improved.

Figure 11:
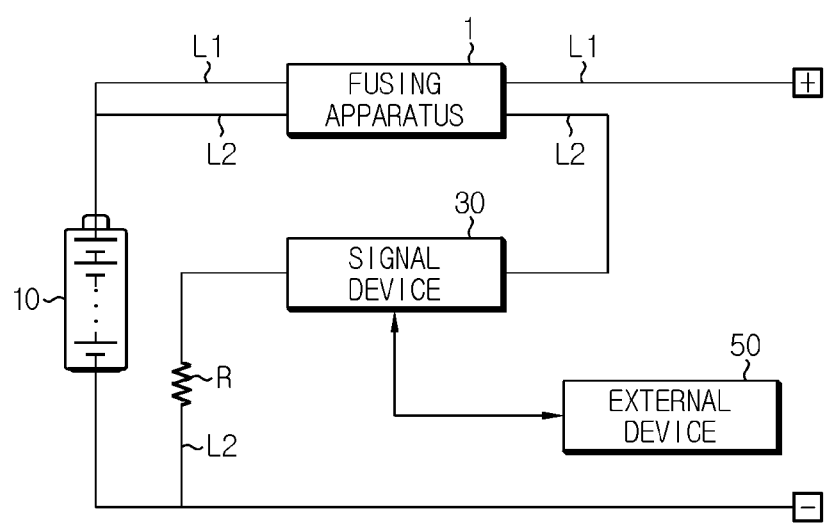
FIG. 11 is a diagram schematically showing the fusing apparatus according to still another embodiment of the present disclosure connected to some components of a battery pack.

FIG. 11 is a diagram schematically showing that the fusing apparatus according to still another embodiment of the present disclosure is connected to some components of a battery pack.

Referring to FIG. 11, the main path L1 may be electrically connected to a positive electrode terminal and a negative electrode terminal of the cell assembly 10. In addition, the main path L1 may be configured to allow electric connection when the main connection member 100 is the connected state.

In addition, the sub path L2 may include a discharge resistor R and may be electrically connected to the positive electrode terminal and the negative electrode terminal of the cell assembly 10. That is, only when the shifting member 300 is connected to the sub connection member 200, the sub path L2 may be electrically connected to the cell assembly 10. In this case, the signal device 30 may receive a power from the cell assembly 10 and transmit an emergency signal to the external device 50.

Preferably, the sub path L2 may be configured to allow electric connection when the shifting member 300 shifts the connection relation from the connected state of the main connection member 100 to the connected state of the sub connection member 200. That is, if the shifting member 300 is connected to the sub connection member 200, the main path L1 is disconnected, so the current output from the cell assembly 10 may flow through the sub path L2. That is, the current output from the cell assembly 10 may flow through the discharge resistor R provided on the sub path L2.

For example, referring to FIGS. 6 and 11, if the explosive provided in the first operation member 410 explodes, the second operation member 420 may come into contact with the body portion 310, and the insert portions 320 may be inserted into the holes H1, H2. In this case, the connection relation of the main connection member 100 is opened to disconnect the main path L1, and the connection relation of the sub connection member 200 is closed to connect the sub path L2. Thus, the current output from the cell assembly 10 may flow through the sub path L2, and the current may be lost while flowing through the discharge resistor R provided on the sub path L2.

In case of an emergency situation in which the shifting member 300 is connected to the sub connection member 200, fusing apparatus 1 according to still another embodiment of the present disclosure may disconnect the main path L1 and transmit an emergency signal to the external device 50 so as to quickly notify an emergency situation.

In addition, when an emergency situation occurs, the fusing apparatus 1 may self-discharge the cell assembly 10 to quickly remove risk factors, thereby preventing further accidents in advance.

Also, the fusing apparatus 1 according to the present disclosure may be provided to a battery pack. That is, the battery pack according to the present disclosure may include the fusing apparatus 1 of the present disclosure. Here, the battery pack may include at least one secondary battery, the fusing apparatus 1, electronic components (including a battery management system (BMS)), a case, and the like.

Meanwhile, terms indicating directions, used in this specification, are intended for convenience of description and may vary depending on the location of an object or an observer, as apparent to those skilled in the art.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

1: fusing apparatus
10: cell assembly
30: signal device
50: external device
100: main connection member
110: first main connection member
120: second main connection member
200: sub connection member
201: concave portion
210: first sub connection member
220: second sub connection member
230: insulation member
300: shifting member
301: protruding portion
310: body portion
320: insert portion
330: insulating portion
400: operation member
410: first operation member
420: second operation member
500: guide member
L1 main path
L2: sub path
H1, H2: hole
R: discharge resistor

What is claimed is:

1. A fusing apparatus, comprising:
a main connection member positioned on a main electrical path, the main connection member including a first main connection member portion positioned on a first side and a second main connection member portion positioned on a second other side;
a sub connection member positioned on a sub electrical path, the sub connection member including a first sub connection member portion positioned on the first side and a second sub connection member portion positioned on the second side; and
a shifting member positioned between the main connection member and the sub connection member, and configured to move from a first location in which the shifting member electrically couples the first main connection member portion to the second main connection member portion to a second location in which the shifting member electrically couples the first sub connection member portion to the second sub connection member portion,
wherein the sub electrical path includes a discharge resistor, and is electrically connected to a positive electrode terminal and a negative electrode terminal of a cell assembly.

2. The fusing apparatus according to claim 1,
wherein the main electrical path is coupled to the positive electrode terminal and the negative electrode terminal of the cell assembly,
wherein the fusing apparatus is configured to provide an electrical connection along the main electrical path when the first main connection member portion is coupled to the second main connection member portion, and
wherein the fusing apparatus is configured to provide an electrical connection along the sub electrical path when the first sub connection member portion is coupled to the second sub connection member portion.

3. The fusing apparatus according to claim 1,
wherein the shifting member is configured to:
disconnect the main electrical path by decoupling the first main connection member portion the second main connection member portion; and
connect the sub electrical path by coupling the first sub connection member portion to the second sub connection member portion.

4. The fusing apparatus according to claim 1,
wherein each of the first main connection member portion and the second main connection member portion includes an electrically conductive material, positioned on a same line of the main electrical path, and spaced apart from each other by a first predetermined distance.

5. The fusing apparatus according to claim 4,
wherein the main connection member is configured such that a first side of the first main connection member portion is electrically connected to a first end of the main electrical path, a first side of the second main connection member portion is electrically connected to a second end of the main electrical path, and each of a second side of the first main connection member portion and a second side of the second main connection member portion are electrically connected to the shifting member.

6. The fusing apparatus according to claim 4, wherein the sub connection member includes a first sub connection member portion and a second sub connection member portion, each including an electrically conductive material and spaced apart from each other by a second predetermined distance.

7. The fusing apparatus according to claim 6, wherein the shifting member is positioned between the first sub connection member portion and the second sub connection member portion to electrically connect the first sub connection member portion to the second sub connection member portion.

8. The fusing apparatus according to claim 6, wherein the first sub connection member portion and the second sub connection member portion are parallel to each other, and wherein at least part of the first sub connection member portion and at least part of the second sub connection member portion face toward each other.

9. The fusing apparatus according to claim 8, wherein the shifting member includes:
a body portion positioned between the first main connection member portion and the second main connection member portion to connect the first main connection member portion to the second main connection member portion; and
an insert portion mounted to the body portion and positioned between the first sub connection member portion and the second sub connection member portion to connect the first sub connection member portion to the second sub connection member portion.

10. The fusing apparatus according to claim 9, wherein each of the first sub connection member portion and the second sub connection member portion, respectively, includes at least one hole, wherein the holes are aligned in a direction perpendicular to the sub electrical path so that the insert portion is capable of being inserted therethrough.

11. The fusing apparatus according to claim 10, further comprising:
an operation member configured to move in a direction perpendicular to the main electrical path and the sub electrical path to contact a first surface of the body portion so that the body portion is detached from the main connection member.

12. The fusing apparatus according to claim 11, further comprising:
a guide member configured to contact the operation member, the shifting member and the sub connection member in the perpendicular direction to maintain alignment of the operation member, the shifting member and the sub connection member.

13. The fusing apparatus according to claim 9, wherein the shifting member further includes an insulating portion made of an insulating material and mounted to the insert portion in a direction perpendicular to the main electrical path and the sub electrical path to connect the first sub connection member portion to the second sub connection member portion.

14. The fusing apparatus according to claim 10, wherein the shifting member includes a plurality of insert portions mounted to the body portion, and
wherein each of the first sub connection member portion and the second sub connection member portion includes a plurality of holes through which the plurality of insert portions are inserted, respectively.

15. A battery pack, comprising the fusing apparatus according to claim 1.

16. The fusing apparatus according to claim 1, wherein the main electrical path electrically connects a cell assembly to a load to supply power from the cell assembly to the load, and wherein the sub electrical path is electrically connected to a signal device configured to transmit an emergency signal in response to current flow along the main electrical path being blocked.

17. A fusing apparatus, comprising:
a main connection member positioned on a main path and including a first side and a second other side electrically connected to the main path, respectively;
a sub connection member positioned on a sub path and including a first side and a second side electrically connected to the sub path, respectively; and
a shifting member positioned between the main connection member and the sub connection member, and configured to move from being coupled to the main connection member to being coupled to the sub connection member to shift from a connected state of the main connection member to a connected state of the sub connection member,
wherein the main path is coupled to a positive electrode terminal and a negative electrode terminal of a cell assembly,
wherein the sub path includes a discharge resistor, and is electrically connected to the positive electrode terminal and the negative electrode terminal of the cell assembly, and
wherein the fusing apparatus is configured to:
provide an electrical connection along the main path when the main connection member is in the connected state, and
provide an electrical connection along the sub path when sub connection member is in the connected state.

* * * * *